(12) United States Patent
Nagai et al.

(10) Patent No.: US 10,620,173 B2
(45) Date of Patent: Apr. 14, 2020

(54) ANALYTICAL MEASUREMENT DEVICE SYSTEM

(71) Applicant: SHIMADZU CORPORATION, Kyoto-shi, Kyoto (JP)

(72) Inventors: Yusuke Nagai, Kyoto (JP); Masato Watanabe, Kyoto (JP)

(73) Assignee: SHIMADZU CORPORATION, Kyoto-shi (JP)

( * ) Notice: Subject to any disclaimer, the term of this patent is extended or adjusted under 35 U.S.C. 154(b) by 437 days.

(21) Appl. No.: 15/421,548

(22) Filed: Feb. 1, 2017

(65) Prior Publication Data

US 2017/0248562 A1 Aug. 31, 2017

(30) Foreign Application Priority Data

Feb. 29, 2016 (JP) .................................. 2016-036674

(51) Int. Cl.
*G01N 30/88* (2006.01)
*G01N 30/74* (2006.01)
(Continued)

(52) U.S. Cl.
CPC ............. *G01N 30/88* (2013.01); *G01N 30/74* (2013.01); *G01N 30/8665* (2013.01);
(Continued)

(58) Field of Classification Search
None
See application file for complete search history.

(56) References Cited

U.S. PATENT DOCUMENTS 4,006,990 A * 2/1977 Munk .................... G01N 21/05
356/246
4,410,271 A * 10/1983 Matthews ............ G01N 21/031
356/301
(Continued)

FOREIGN PATENT DOCUMENTS

CN 104956229 A 9/2015
JP 9-171022 A 6/1997
(Continued)

OTHER PUBLICATIONS

Office Action dated Apr. 18, 2018, issued in counterpart Chinese application No. 201710096530.4, with English translation. (11 pages).
(Continued)

*Primary Examiner* — John E Breene
*Assistant Examiner* — Brandon J Becker
(74) *Attorney, Agent, or Firm* — Westerman, Hattori, Daniels & Adrian, LLP

(57) ABSTRACT

Provided is an analytical measurement device system 10 having a plurality of units (liquid-sending pump 12; detector 15) including: a sensor (flow sensor 121; light amount detector 151) provided in at least one unit among the plurality of units, for detecting the condition of a specific portion of the unit; a determination section (flow rate determiner 122; light amount determiner 152) provided in the unit, for receiving a signal from the sensor and for determining an overall condition of the unit based on a predetermined determination criterion; a storage section (flow-rate determination information storage section 123; light-amount determination information section 153) provided in the unit, for storing the determination criterion and a result of the determination by the determination section; and a display section (flow-rate determination result display section 124; light-amount determination result display sec-
(Continued)

tion 154) provided in the unit, for displaying the determination result.

2 Claims, 2 Drawing Sheets

(51) Int. Cl.
*G01N 30/86* (2006.01)
*G01N 30/02* (2006.01)
*G01N 35/00* (2006.01)

(52) U.S. Cl.
CPC . *G01N 35/00623* (2013.01); *G01N 2030/027* (2013.01); *G01N 2030/8804* (2013.01); *G01N 2030/889* (2013.01)

(56) References Cited

U.S. PATENT DOCUMENTS

| | | | |
|---|---|---|---|
| 5,037,199 A * | 8/1991 | Hlousek | G01N 21/255 356/246 |
| 5,920,389 A * | 7/1999 | Bungo | G01J 3/2803 356/325 |
| 6,144,366 A * | 11/2000 | Numazaki | G06F 3/011 345/156 |
| 2015/0362514 A1 | 12/2015 | Tamezane et al. | |
| 2016/0245690 A1 | 8/2016 | Nammoku et al. | |
| 2016/0258913 A1 * | 9/2016 | Uchiho | G01N 30/74 |
| 2017/0010213 A1 * | 1/2017 | Jingu | G01N 21/4133 |

FOREIGN PATENT DOCUMENTS

| | | | |
|---|---|---|---|
| JP | 10-318803 A | | 12/1998 |
| JP | 2010-286493 A | | 12/2010 |
| JP | 2010286493 A | * | 12/2010 |
| JP | 2014-235153 A | | 12/2014 |
| JP | 2014235153 A | * | 12/2014 |
| WO | 2015/029595 A1 | | 3/2015 |
| WO | WO-2015029595 A1 | * | 3/2015 |

OTHER PUBLICATIONS

Office Action dated Jun. 25, 2019, issued in counterpart JP Application No. 2016-036674, with English translation (10 pages).

* cited by examiner

ANALYTICAL MEASUREMENT DEVICE SYSTEM

TECHNICAL FIELD

The present invention relates to an analytical measurement device system for analyzing a sample and for measuring its properties. In particular, it relates to an analytical measurement device system provided with the function of detecting a problem with the device before the problem actually occurs.

BACKGROUND ART

In some cases, e.g. when the result of an analytical measurement is used as a basis for a legal action, an inspection (validation) for determining whether or not the entire analytical measurement device has the specified characteristics is performed on a regular basis, or before or after specific measurements, in order to guarantee the correctness of the result of the analytical measurement. A point to be checked in the validation is whether or not the result of an analysis or measurement performed on a standard sample by the analytical measurement device with specified standard measurement conditions set in the device meets specified criteria. Whether or not some specific sections constituting the device meet specified criteria is also checked.

Such a validation is not only performed at stipulated periods of time but also before every critical measurement. Additionally, an appropriate level of inspection is performed as needed before normal measurements. Such validations and inspections are aimed at guaranteeing the correctness of the result of the analysis or measurement as well as preventing any interruption of the measurement by a malfunction of a section of the device. In particular, when the measurement is automatically performed for a long period of time, an interruption of the measurement does not only mean a waste of time but may possibly incur a waste of important samples.

To address this problem, an analytical measurement device system is proposed in Patent Literature 1, in which a tag is attached to each part constituting the device, and an identifying module for reading the tag is provided on the device side to manage expendable parts and inform users of the timing to replace such parts. With this system, it is possible to avoid the situation in which the timing to replace an expendable part comes in the middle of the measurement which is scheduled to be performed soon. This system can also inform users when an incorrect part is attached.

Patent Literature 2 discloses an analyzing device for sequentially performing analyses for a plurality of samples according to a preset analysis schedule. The analysis schedule includes items for specifying, for the analysis of each individual sample, whether or not a diagnostic operation needs to be performed and what kind of operation should be performed according to the result of the diagnosis. When a series of analyses are performed, the analyzing device checks the condition of each specified section in the device before or after the analysis of the sample for which the diagnostic operation is specified in the analysis schedule, and controls the analyzing operation according to the process steps as specified in the analysis schedule.

CITATION LIST

Patent Literature

Patent Literature 1: JP 09-171022 A
Patent Literature 2: JP 10-318803 A

SUMMARY OF INVENTION

Technical Problem

In an analytical measurement device system which includes various units combined together, a controller for controlling those units in a unified manner is normally provided. Such a controller is indispensable in some cases, such as an automatic analysis for continuously analyzing a plurality of samples. In the analytical measurement devices described in Patent Literatures 1 and 2, such a controller is used in order to manage information concerning the expendable parts in each unit or sequentially perform an analysis for a plurality of samples according to a preset analysis schedule.

Accordingly, the expendable-part information or diagnosis information of each unit constituting the analytical measurement device system is held and managed by the controller of the system. However, if one unit is disconnected from the system, it is impossible to know the condition of each expendable part in that unit or the condition of the unit itself (e.g. whether or not its accuracy is deteriorating). Therefore, when this unit is used in a different system, it is necessary to extract related information from the system in which this unit was previously used, or previously keep a dedicated management file (in a hard copy or electronic form) for that unit, in order to use the unit in a satisfactorily managed form.

The problem to be solved by the present invention is to provide an analytical measurement device system which includes a plurality of units and is capable of managing each unit in a more correct and satisfactory manner than the conventional systems.

Solution to Problem

The present invention developed for solving the previously described problem is an analytical measurement device system including a plurality of units, the system further including:

a) a sensor provided in at least one unit among the plurality of units, for detecting the condition of a specific portion of the unit;

b) a determination section provided in the unit, for receiving a signal from the sensor and for determining an overall condition of the unit based on a predetermined determination criterion;

c) a storage section provided in the unit, for storing the determination criterion and a result of the determination by the determination section; and d) a display section provided in the unit, for displaying the result of the determination.

The "condition of a specific portion of the unit" means a specific physical quantity that can be detected or measured with a commonly used sensor, as opposed to a quantity related to the entire unit. For example, consider the case where the analytical measurement device system is a liquid chromatograph system. If the unit concerned is a pump, the physical quantity may be the pressure, temperature or other quantities related to the pump. If the unit concerned is an ultraviolet (UV) detector, the physical quantity may be the amount of light transmitted through a sample cell, the amount of light bypassing the sample cell (reference light) or other quantities. The "overall condition of the unit" means whether the unit is in the normal condition and can operate correctly, or in a defective condition and cannot provide the required performance. It is also possible to add a "deteriorating" condition in which the unit is not yet defective but is approaching the defective condition.

In the analytical measurement device system according to the present invention, the determination section compares the signal representing the condition of the specific portion of the unit detected by the sensor with the determination criterion stored in the storage section, to determine the overall condition of the unit. In other words, the unit performs a self-diagnosis of itself.

The determination criterion stored in the storage section may be previously determined for that unit (by the manufacturer), or it may be provided as a piece of modifiable information which users can appropriately modify using an input device provided for that unit and save beforehand in the storage section. If the present analytical measurement device system is provided with a system controller for controlling the entire system, the determination criterion may be provided from this system controller. The determination section saves the determination result (self-diagnosis result) in the storage section as well as shows it on the display section. By viewing the display on the display section of the unit, users can know the result of the self-diagnosis by the unit and determine whether or not the unit is operable. When the unit is used in another analytical measurement device system, the unit can be correctly managed and used in that system, since the result of the self-diagnosis is stored in the storage section of the unit. The unit can also leave evidence for the correct execution of the measurement, by saving, as the result of the self-diagnosis, a piece of information which indicates that the device is correctly operating during the measurement.

In the analytical measurement device system according to the present invention, if there are two or more units having the sensor, determination section, storage section and display section as described, each of the units may additionally be provided with a communicator for enabling those units to send and receive a signal to and from each other. This configuration enables the determination section in one unit to additionally take into account the result detected with the sensor of another unit and determine the overall condition of its own unit. Therefore, an even more correct and satisfactory self-diagnosis is possible.

Advantageous Effects of the Invention

In the analytical measurement device system according to the present invention, at least one unit among the plurality of units constituting the system is provided with a sensor for detecting the condition of a specific portion of the unit. Using this sensor, the unit can determine the overall condition of the unit and perform a self-diagnosis. The result of the self-diagnosis is saved in the storage section as well as shown on the display section. Even when the unit is disconnected from the system, users can know the (overall) condition of the unit and determine whether or not the unit is operable. When the unit is used in another analytical measurement device system, the unit can be managed and used in a correct and satisfactory manner in that system.

In the case of the conventional analytical measurement device system in which a general controller of the system additionally performs the task of managing each unit, it is impossible to perform diagnosis on any unit during an analysis of a sample even if the unit is not involved in the analysis. By comparison, in the analytical measurement device system according to the present invention, even in the middle of an analysis of a sample, it is possible to determine the condition of a unit if the unit is not involved in the analysis, since the unit has the function of performing a self-diagnosis in the previously described manner. This function is particularly useful when a continuous analysis is performed for many samples over a long period of time.

DESCRIPTION OF EMBODIMENTS

Embodiments of the analytical measurement device system according to the present invention are hereinafter described using FIGS. 1-4.

Figure 1:
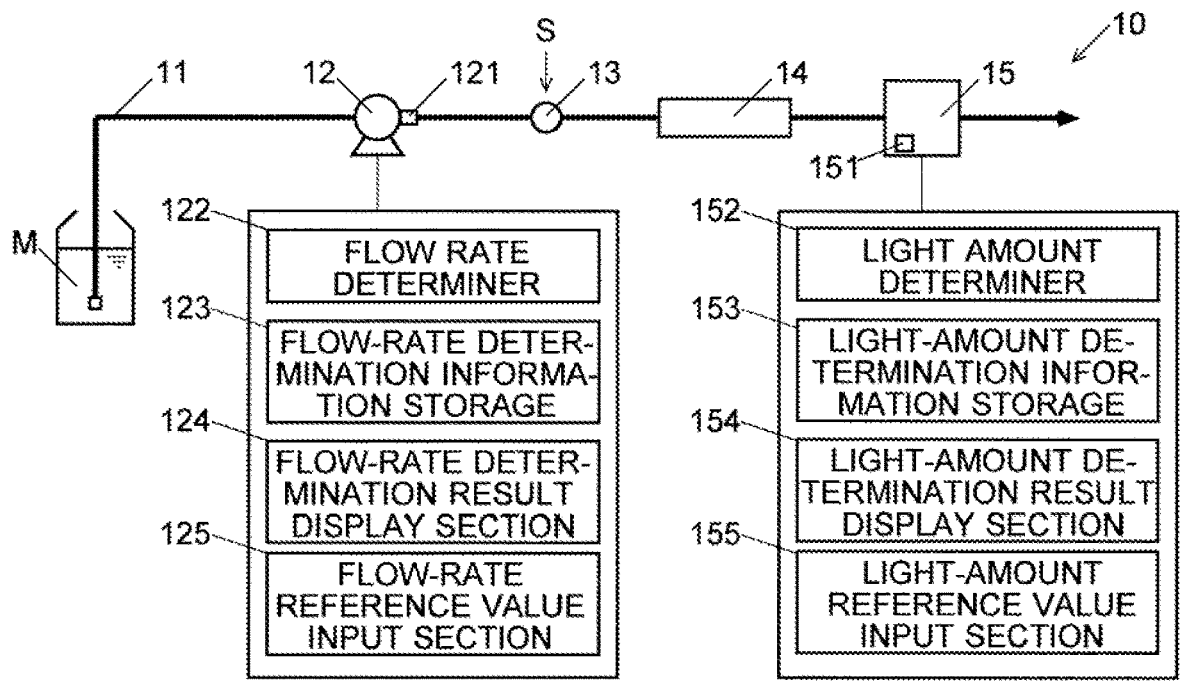
FIG. 1 is a schematic configuration diagram showing the first embodiment of the analytical measurement device system according to the present invention.

FIG. 1 shows an analytical measurement device system 10 of the first embodiment. This analytical measurement device system 10 is a high-performance liquid chromatograph (HPLC), in which a liquid-sending pump 12, sample injector 13, analytical column 14 and detector 15 are provided in the mentioned order on a passage 11 through which a mobile phase M flows. The liquid-sending pump 12 supplies the mobile phase M to the sample injector 13. The sample injector 13 injects a sample S into the mobile phase M flowing through the passage 11. The analytical column 14 separates the components contained in the sample S injected by the sample injector 13, using the difference in the elution time among those components. The detector 15 measures optical characteristics, electric characteristics, or other characteristics of an eluate exiting from the analytical column 14. By measuring the temporal change in those characteristics, the components contained in the sample can be detected. In the present embodiment, a wavelength-variable ultraviolet (UV) detector (which will be described later) is used as the detector 15.

The liquid-sending pump 12 is provided with a flow sensor 121, flow rate determiner 122, flow-rate determination information storage section 123, and flow-rate determination result display section 124. The flow sensor 122 detects the amount of flow per unit time of the mobile phase supplied by the liquid-sending pump 12. The flow rate determiner 122, which is embodied using a central processing unit (CPU), determines whether or not the magnitude of the temporal change in the flow rate detected with the flow sensor 121 is equal to or smaller than a predetermined reference value. The temporal change in the flow rate occurs when the liquid-sending pump 12 becomes unable to supply the mobile phase at a fixed flow rate due to a deterioration of some part of the pump. Such a change must be reduced since it unfavorably affects the baseline of the detection signal obtained with the detector 15. The flow-rate determination information storage section 123 is used to store the determination criterion, i.e. the reference value of the magnitude of the temporal change in the flow rate, and to save the result of the determination by the flow rate determiner 122. The flow-rate determination result display section 124 is a display (image display device) for showing the determination result. In place of the display, two lamps may also be provided, one of which indicates that the determination result is "normal" while the other indicates that the result is "defective". Using only one lamp which informs of the "defective" state is also possible.

The reference value recorded in the flow-rate determination information storage section 123 can be inputted by the manufacturer of the analytical measurement device system 10 when the product is shipped, or a flow-rate reference value input section 125 (FIG. 1), such as operation keys, may additionally be provided in the flow-rate determination information storage section 123 to allow users of the analytical measurement device system 10 to input the reference value. It is also possible to provide the analytical measurement device system 10 with a system controller 16 (FIG. 2) for the general control of the analytical measurement device system 10, and give the reference value from this system controller 16 to the flow-rate determination information storage section 123. In addition to giving determination criteria to the flow-rate determination information storage section 123 and light-amount determination information storage section 153 (which will be described later), the system controller 16 also controls various operations and settings, such as the ON/OFF operation of the liquid-sending pump 12, timing to inject the sample S from the sample injector 13 into the mobile phase M, and operations of the light source and diffraction grating (which will be described later) in the detector 15.

Figure 3:
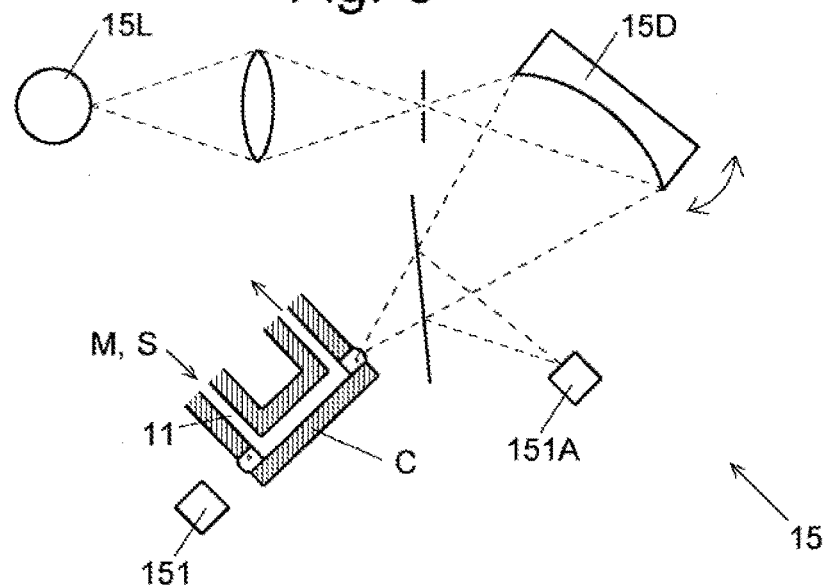
FIG. 3 is a schematic configuration diagram showing one example of the wavelength-variable UV detector.

In the wavelength-variable UV detector used as the detector 15 in the present embodiment, as shown in FIG. 3, the light emitted from the light source 15L is dispersed into component wavelengths by the diffraction grating (spectroscope) 15D. A beam of light having one of those wavelengths is selectively cast onto the sample S in the mobile phase M passing through the flow cell C in the passage 11. The amount of light which has passed through the sample S is detected with the light amount detector 151. The light of the selected wavelength is split at a point before the flow cell C, and a portion of the light is not cast onto the sample but is used as the reference light, the amount of which is detected with the light amount detector 151 or another light amount detector 151A (FIG. 3). For distinction from this reference light, the light cast into the flow cell C is hereinafter called the "sample light". In addition to the light source 15L, diffraction grating 15D and light amount detector 151, the detector 15 includes a light amount determiner 152, light-amount determination information storage section 153 and light-amount determination result display section 154. The light amount determiner 152 determines whether or not each of the detected values of the amounts of sample light and reference light is within a light-amount reference range specified for each of the sample and reference lights, and determines the condition of the detector 15 in a manner which will be described later. The process of judging the amount of sample light by the light amount determiner 152 is performed without injecting the sample S into the mobile phase M. The light-amount determination information storage section 153 is used to store the reference criteria, i.e. the predetermined light-amount reference ranges, and to save the result of the determination by the light amount determiner 152. The light-amount determination result display section 154 is a display for showing the result of the determination by the light amount determiner 152. As with the flow-rate determination result display section 124, the light-amount determination result display section 154 may include, in place of the display, two lamps one of which indicates that the determination result is "normal" while the other indicates that the result is "defective", or only one lamp which informs of the "defective" state.

The light amount determiner 152 determines the condition of the detector 15 as follows: If both the amount of sample light and that of the reference light are within their respective reference ranges, the light amount determiner 152 concludes that the detector 15 is in the normal condition. If both the amount of sample light and that of the reference light are out of their respective reference ranges, the light amount determiner 152 concludes that the problem is not associated with the flow cell C (through which only the sample light passes), but with an optical element which affects both the sample light and the reference light, such as the light source 15L, light amount detector 151 (if the reference light is detected with the light amount detector 151) or diffraction grating 15D. A possible cause of the problem with the light source 15L is the decrease in the amount of light due to aging, while that of the problem with the light amount detector 151 is the contamination of an optical element. If the amount of reference light is within the predetermined reference range and only the amount of sample light is out of the predetermined reference range, the light amount determiner 152 concludes that there is a problem with the flow cell C. A possible cause of the problem with the flow cell C is its contamination. If the amount of sample light is within the predetermined reference range and only the amount of reference light is out of the predetermined reference range, the light amount determiner 152 concludes that there is a problem with the alignment of the optical axis of the reference light.

Figure 2:
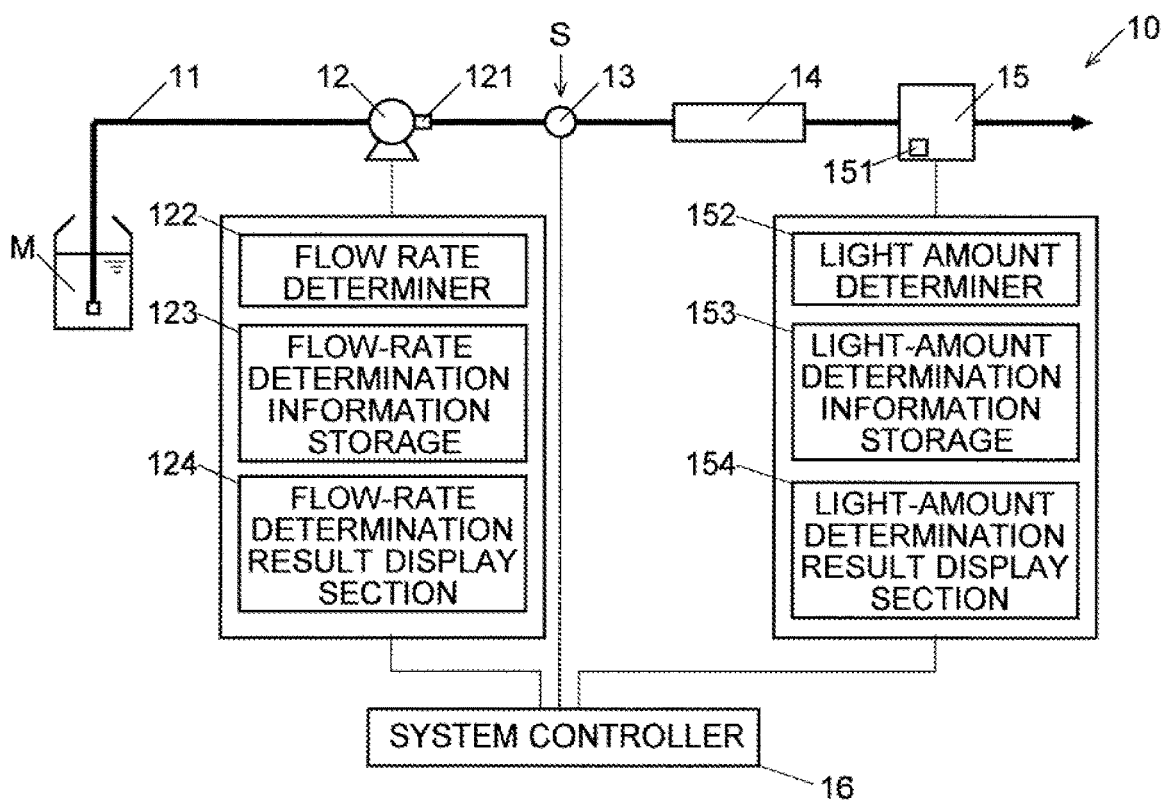
FIG. 2 is a schematic configuration diagram showing one variation of the analytical measurement device system of the first embodiment.

As in the case of the flow-rate determination information storage section 123, the predetermined light-amount reference range recorded in the light-amount determination information storage section 153 may be inputted by the manufacturer of the analytical measurement device system 10 when the product is shipped, or inputted by users through a light-amount reference value input section 155 (FIG. 1) provided in the light-amount determination information storage section 153, or given from the system controller 16 (FIG. 2).

In the analytical measurement device system 10 of the present embodiment, a sensor is provided in each of the two aforementioned units, i.e. the liquid-sending pump 12 and the detector 15, making it possible for each unit to determine its condition and perform a self-diagnosis. The result of the self-diagnosis is saved in the storage section in each unit as well as displayed on the display section of each unit. Users can know the condition of each unit in the disconnected state and determine whether or not that unit is operable. When these units are used in another analytical measurement device system, the units can be managed and used in a correct and satisfactory manner in the new system, since the results of the self-diagnosis are stored in their storage sections.

As the detector 15, a photodiode array detector having an array of photodiodes may be used in place of the wavelength-variable UV detector. In the detector 15 having a photodiode array, the light which is cast from the light source into the flow cell C and transmitted through the sample S is dispersed into component wavelengths, which are individually detected by the photodiodes in the photodiode array. To determine the condition of this detector 15, two kinds of light are used, i.e. the sample light, which travels from the light source to the photodiode array along the same optical path as used in the measurement of the sample S, and the reference light, which is a portion of the light from the light source split at a point before the flow cell C, and which bypasses the flow cell C and follows the same optical path as the sample light eventually reaching the photodiode array along via the diffraction grating. The reference light may also be a portion of the light from the light source which is split at a point before the flow cell C, and which bypasses the flow cell C and follows an optical path eventually reaching a detector (photodiode) different from the one used for detecting the sample light, via a diffraction grating which may be the same as or different from the one used for diffracting the sample light. It is also possible to use, as the reference light, a beam of light detected by the detector 15 through the same optical path as the sample light with the flow cell C removed. Whether this detector 15 is in the normal or defective condition can be determined using these sample and reference lights in the same manner as in the case of the wavelength-variable UV detector.

In the previously described example, only one reference value of the magnitude of the temporal change in the flow rate is used in the determination of the condition of the liquid-sending pump 12. Instead, a second reference value greater than the first reference value may additionally be used with the first reference value. In this case, the flow rate determiner 122 can make a three-level judgment according to the value detected with the flow sensor 121, e.g. "normal" if the detected value is equal to or smaller than the first reference value, "deteriorating" or "time to replace parts approaching" if the detected value is larger than the first reference value and equal to or smaller than the second reference value, and "defective" or "part replacement required" if the detected value is larger than the second reference value. A similar three-level judgment can also be made in the determination of the amount of light detected with the detector 15.

In the case of the liquid-sending pump 12, it is possible to judge the temporal change in the pressure of the mobile phase M instead of judging the temporal change in the flow rate of the mobile phase M.

Figure 4:
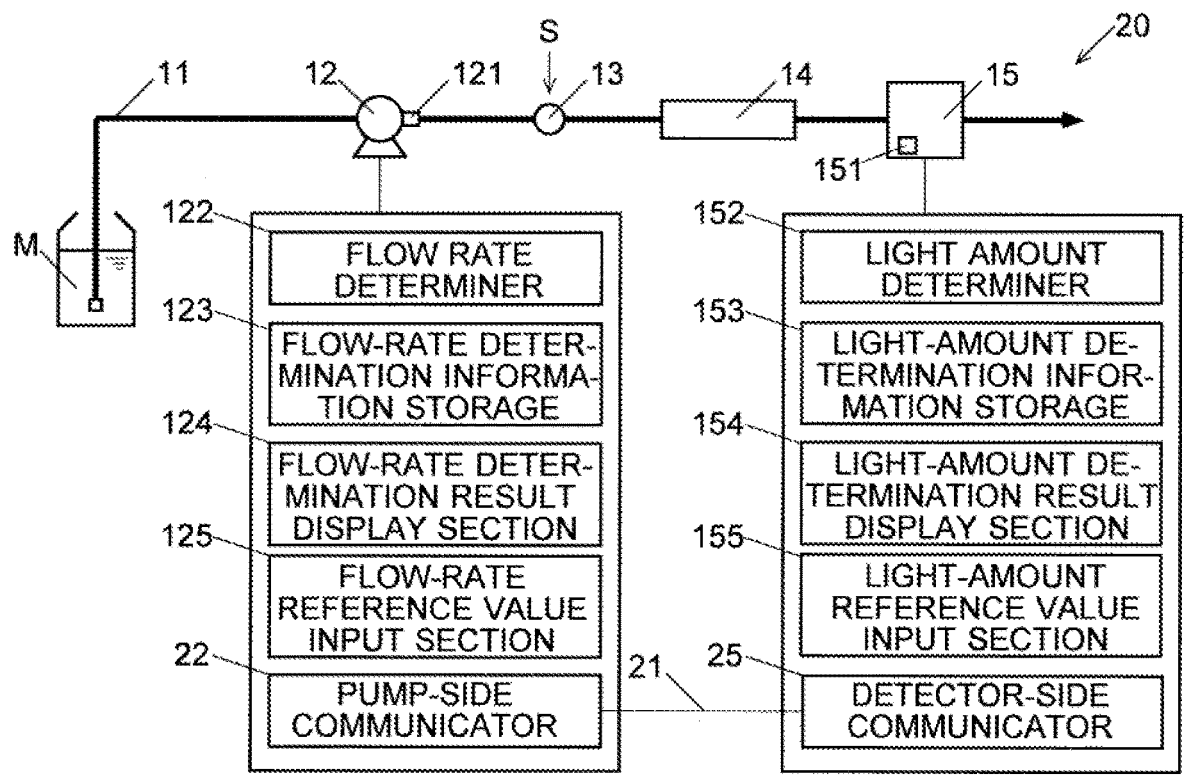
FIG. 4 is a schematic configuration diagram showing the second embodiment of the analytical measurement device system according to the present invention.

Hereinafter, an analytical measurement device system 20 of the second embodiment is described. As shown in FIG. 4, this analytical measurement device system 20 includes a pump-side communicator 22 and detector-side communicator 25, as well as a communication line 21 connecting the pump-side and detector-side communicators 22 and 25, in addition to the components of the analytical measurement device system 10 of the first embodiment. The pump-side communicator 22 sends the detection signal of the flow sensor 121 through the communication line 21 to the detector-side communicator 25. The detector-side communicator 25 has the function of receiving the detection signal. The configuration shown in FIG. 4 has the flow-rate reference value input section 125 and the light-amount reference value input section 155 but does not have the system controller 16. It is also possible to adopt the configuration which has the system controller 16 but does not have the flow-rate reference value input section 125 and the light-amount reference value input section 155.

In the analytical measurement device system 20 of the second embodiment, the light amount determiner 152 makes a judgment based on the amounts of sample light and reference light detected by the light amount detector 151 as well as the detection signal of the flow sensor 121 received by the detector-side communicator 25, i.e. the flow rate of the mobile phase M. The judgment is made as follows: The amount of sample light does not only change due to a problem with the detector 15, such as the contamination of the flow cell C; it also changes due to a change in the flow rate of the mobile phase M, which is a problem with the liquid-sending pump 12. Accordingly, if the amount of sample light is out of a predetermined reference range, the light amount determiner 152 compares the temporal change in the amount of sample light with the temporal change in the flow rate of the mobile phase M, and calculates the correlation function between the two. If the degree of correlation between the temporal change in the amount of light and the temporal change in the flow rate is equal to or higher than a certain level, the light amount determiner 152 concludes that the problem is not associated with the detector 15 but the liquid-sending pump 12; the detector 15 is considered to be normal. Conversely, if the temporal change in the amount of light is not, or only poorly, correlated with the temporal change in the flow rate, the light amount determiner 152 subsequently determines whether or not there is a problem with the detector 15 by the same method as in the first embodiment.

In the analytical measurement device system 20 of the second embodiment, when the degree of correlation between the temporal change in the amount of light and the temporal change in the flow rate is equal to or higher than a certain level, a signal which signifies the fact may be sent from the detector-side communicator 25 to the pump-side communicator 22. Upon receiving this signal, the flow rate determiner 122 can conclude that there is a problem with the liquid-sending pump 12.

Thus far, the liquid-sending pump and the detector in a HPLC have been considered as the units to be examined for a problem. The present invention can also be similarly applied for a vacuum pump and detector in a gas chromatograph, as well as in various kinds of measurement devices having a plurality of detectors. If there is only one unit to be examined for a problem, the present invention is still useful because it enables the unit to perform a self-diagnosis.

The previously described embodiments and their variations are mere examples of the present invention, and any change, modification or addition appropriately made within the spirit of the present invention will naturally fall within the scope of claims of the present application.

REFERENCE SIGNS LIST 10, 20 . . . Analytical Measurement Device System
11 . . . Passage
12 . . . Liquid-Sending Pump
121 . . . Flow Sensor
122 . . . Flow Rate Determiner
123 . . . Flow-Rate Determination Information Storage Section
124 . . . Flow-Rate Determination Result Display Section
125 . . . Flow-Rate Reference Value Input Section
13 . . . Sample Injector
14 . . . Analytical Column
15 . . . Detector
151, 151A . . . Light Amount Detector
152 . . . Light Amount Determiner
153 . . . Light-Amount Determination Information Storage Section
154 . . . Light-Amount Determination Result Display Section 155 . . . Light-Amount Reference Value Input Section
15D . . . Diffraction Grating
15L . . . Light Source
16 . . . System Controller
21 . . . Communication Line
22 . . . Pump-Side Communicator
25 . . . Detector-Side Communicator
C . . . Flow Cell
M . . . Mobile Phase
S . . . Sample

The invention claimed is:

1. A chromatograph comprising a liquid-sending pump, a sample injector, an analytical column, and a detector,
wherein the detector comprises:
a light source;
a flow cell through which a mobile phase including a sample flows;
an optical element configured to cast light from the light source as sample light to the flow cell;
a sample light detection section configured to detect the sample light transmitted through the flow cell;
a reference light detection section configured to detect reference light that is a portion of the light from the light source split at a point before the flow cell;
a light amount determination section configured to determine whether or not an amount of the sample light detected by the sample light detection section and an amount of the reference light detected by the reference light detection section is included within a predetermined reference range specified for each of the sample and reference lights;
a device state determination section configured to determine the detector to be in a normal condition if both the amount of the sample light and the amount of the reference light are determined to be within their predetermined reference ranges, determining that there is a problem with the light source or the optical element if both the amount of the sample light and the amount of the reference light are determined to be out of their predetermined reference ranges, determining that there is a problem with the flow cell if the amount of the reference light is determined to be within the predetermined reference range and the amount of sample light is determined to be out of the predetermined reference range, and determining that there is a problem with an alignment of an optical axis of the reference light if the amount of the sample light is determined to be within the predetermined reference range and the amount of reference light is determined to be out of the predetermined reference range;
a storage section configured to store the predetermined reference range specified for each of the sample and reference lights and a result of a determination by the light amount determination section and the device state determination section; and
a display section configured to display the result of the determination.

2. The chromatograph according to claim 1,
wherein the liquid-sending pump comprises a flow sensor configured to detect an amount of flow per unit time of a mobile phase supplied by the liquid-sending pump, and
wherein, if the amount of the sample light is out of the predetermined reference range, the device state determination section compares a temporal change in the amount of the sample light with a temporal change in a flow rate of the mobile phase, and determines that there is a problem with the liquid-sending pump if a degree of correlation is recognized between the temporal change in the amount of the sample light and the temporal change in the flow rate.

* * * * *